United States Patent [19]
Baird et al.

[11] Patent Number: 5,574,782
[45] Date of Patent: Nov. 12, 1996

[54] MINIMIZING SERVICE DISRUPTIONS IN HANDLING CALL REQUEST MESSAGES WHERE NEW MESSAGE FORMATS ARE NEEDED IN A TELECOMMUNICATION NETWORK

[75] Inventors: Michael H. Baird, Pickerington; Dennis W. Jackson, Reynoldsburg; Ren-Wei Liou, Gahanna, all of Ohio

[73] Assignee: Lucent Technologies Inc., Murray Hill, N.J.

[21] Appl. No.: 422,281

[22] Filed: Apr. 14, 1995

[51] Int. Cl.⁶ .................................................. H04M 3/42
[52] U.S. Cl. ........................ 379/220; 379/207; 379/229
[58] Field of Search ................................ 379/220, 219, 379/207, 201, 95, 96, 229

[56] References Cited

U.S. PATENT DOCUMENTS

| | | | |
|---|---|---|---|
| 5,422,941 | 6/1995 | Hasenauer et al. | 379/207 |
| 5,425,090 | 6/1995 | Orriss | 379/207 |
| 5,430,719 | 7/1995 | Weisser, Jr. | 379/95 |
| 5,438,568 | 8/1995 | Weisser, Jr. | 379/96 |
| 5,455,853 | 10/1995 | Cebulka et al. | 379/207 |
| 5,469,500 | 11/1995 | Satter et al. | 379/207 |
| 5,473,679 | 12/1995 | La Porta et al. | 379/207 |
| 5,475,746 | 12/1995 | Miller et al. | 379/207 |
| 5,481,601 | 1/1996 | Nazif et al. | 379/207 |

*Primary Examiner*—Krista M. Zele
*Assistant Examiner*—Scott Wolinsky
*Attorney, Agent, or Firm*—Charles L. Warren

[57] ABSTRACT

A service control point (SCP) node operates under the control of computer program instructions which interpret message instructions generated by a service administrator. The message instructions provide a hierarchical command structure which permits the SCP node to generate network messages having formats not previously defined as well as changing user specified data. Such network messages are transmitted by the SCP node to identified switches in a telecommunication network in order to determine how a call request, such as an incoming "800" call, will be handled and/or routed by the telecommunication network.

18 Claims, 5 Drawing Sheets

MINIMIZING SERVICE DISRUPTIONS IN HANDLING CALL REQUEST MESSAGES WHERE NEW MESSAGE FORMATS ARE NEEDED IN A TELECOMMUNICATION NETWORK

BACKGROUND OF THE INVENTION

This invention relates generally to telecommunication networks in which subscribers can select how incoming calls are to be handled. The invention, more specifically, relates to network messages which are used to define how incoming calls are processed in the telecommunication network.

Telecommunication networks provide users with the ability to determine how incoming calls (call requests) are to be handled or processed. For example, a company in the United States may provide its customers with toll-free "800" telephone numbers as a convenience in servicing their requests for sales, service, and product information. Teams of agents employed by the company may be provided at different geographic locations to receive and process the customer's calls. However, the company may desire to have such incoming calls handled by different agent teams, depending upon the time of day and/or the day of the week, or type of call. An explanation of the processing of such calls by the telecommunication network is provided below.

Figure 1:
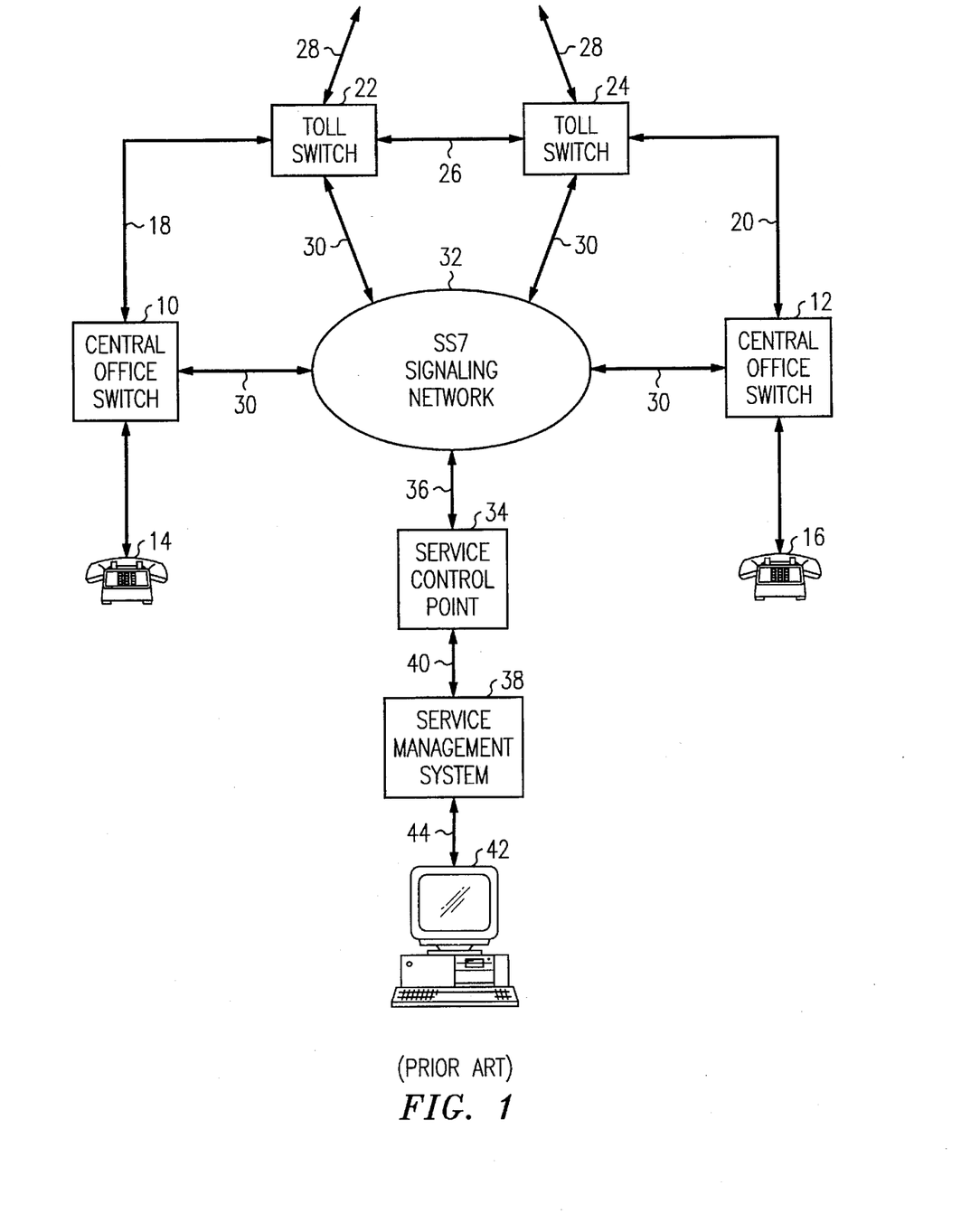
FIG. 1 is a block diagram illustrating a prior art representation of a telecommunication network.

FIG. 1 illustrates a known telecommunication network which includes central office switches 10 and 12 which support a plurality of subscribers using cutover premises equipment 14 and 16, respectively. The central office switches 10 and 12 are coupled by trunk lines 18 and 20 to toll switches 22 and 24, respectively. The toll switches 22 and 24 are connected together by a trunk line 26 and are connected to other central office switches and/or other toll switches by trunk lines 28. It will be apparent to those skilled in the art that a substantial number of central office switches and toll switches may be interconnected to provide a communication system within a geographic area such as within the continental United States. In the illustrative example, the central office switches and the toll switches may comprise 5ESS® switches and 4ESS™ switches which are available from AT&T Corp. The illustrative customer premises equipment 14 and 16 may comprise analog or digital telephone sets as well as other communication equipment including terminals, computers linked by modems, and other forms of video or other information systems.

A signaling network 32 which may follow the signaling system 7 (SS7) standard is connected by communication channels 30 to the central office and toll switches. It is well known that the signaling network will typically include a plurality of communication nodes such as signal transfer points (STP) which exist to relay (transmit) network messages between the switches in order to control the processing and routing of calls. A service control point (SCP) node 34 is connected by communication channel 36 with the signaling network 32. The SCP node, also known as a network control point (NCP), provides the intelligence which provides the processing logic and stores the subscriber provided data which defines how incoming call requests are to be handled. As used herein, the handling of a call means resulting actions based on an incoming call request and may include the providing of a variety of services including, but not limited to, determining a routing destination of the associated call. A service management system (SMS) 38 is connected by communication channel 40 to the SCP node 34. The SMS 38 is utilized to provision the subscriber data and logic processing definitions stored in SCP node 34. A computer workstation 42 is coupled by communication channel 44 to SMS 38 and provides a system administrator or service provisioning agent with an interface to the SMS 38 and provides the mechanism by which the call handling requirements of a customer are entered into the SCP node. The SMS 38 provides a communication interface to transmit control information and data entered by a system provisioning agent using station 42 to the SCP node 34 such as over a X.25 communication link 40. The SCP node 34 may comprise a No. 2 direct services dialed (2DSD) node available from AT&T Corp. The service management system 38 may comprise an Intelligent Network Service Management System (INSMS) available from AT&T Corp.

The SCP node 34 contains service logic which receives call processing messages from signaling network 32, processes such messages, and generates and transmits network messages transmitted to signaling network 32 which are routed to the appropriate switch to provide control instructions and data concerning the handling of a corresponding call. Such messages may comply with a known protocol such as the transaction capabilities application part (TCAP) as associated with the SS7 network. The SCP node 34 also contains a database which stores data associated with specific customers which is accessed by the signal processing routines in order to generate the network messages which will provide the instructions to the switches to provide the processing and routing of calls as desired by the called party.

Figure 2:
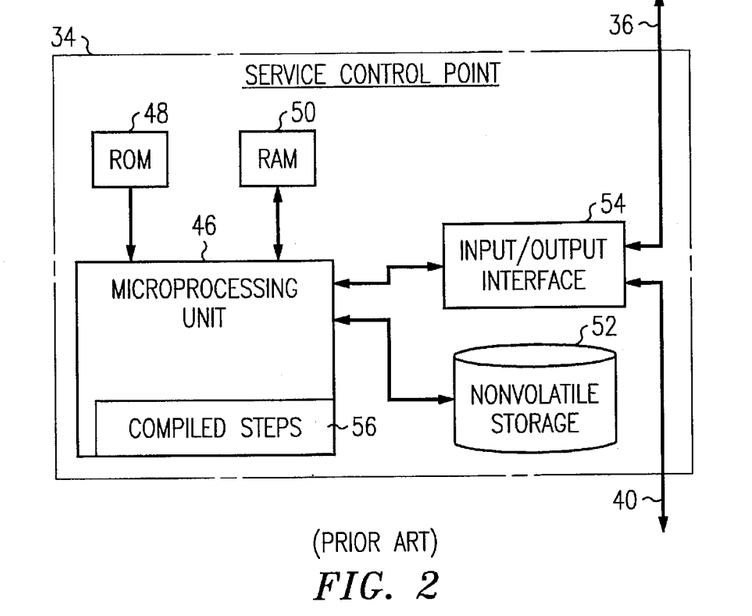
FIG. 2 is a block diagram illustrating a prior art representation of a service control point node.

FIG. 2 illustrates a block diagram of an exemplary SCP node 34. It contains a microprocessing unit 46, read-only memory (ROM) 48, random access memory (RAM) 50, and a nonvolatile data storage device 52 which may comprise a hard drive or other type of nonvolatile data storage. These elements are coupled to and support the operation of microprocessing unit 46. An input/output interface 54 is also coupled to microprocessing unit 46 and provides a communications interface for signals being transmitted and received on communication lines 36 and 40. Program control instructions which control the operation of microprocessing unit 46 may be stored in ROM 48, RAM 50, and storage device 52. As is known to those skilled in the art, such processing steps and operating routines may be accessed and utilized in accordance with the overall processing instructions being executed by microprocessing unit 46. The nonvolatile storage device 52 may also be utilized to store customer provided data related to different users and hence, provides the information needed to make call handling decisions. For example, a customer may alter the destination of a received 800 call request, depending upon the time of day so that calls placed at the beginning of a business day are placed to agents located in the Eastern United States and so that calls placed at the end of the business day are routed to operating agents located in the Western United States. The routing of calls based on time-of-day parameters is controlled by storing customer data in the database of the SCP node indicating the times during which incoming calls are to be routed to the agent destinations in the Eastern and Western United States. Thus, call destinations are determined by the SCP node 34 in response to a network message corresponding to a call request.

The microprocessing unit 46 of SCP node 34 includes a visually depicted region of compiled steps 56 which represents program instructions which have been compiled for direct execution by the microprocessing unit as is known to those skilled in the art. Such processing steps may include the receipt and decoding of network messages received from the signaling network 32, locating and retrieving user data stored in the database in storage device 52, and the generation and transmission of network messages having a predefined format to signaling network 32. Similarly, received instructions from the SMS 38 are decoded and acted upon by the compiled steps 56 to place new user data in an appropriate memory location. The compiled processes are efficient in that these are directly executed by the microprocessing unit 46, but are also restrictive in that changes to the compiled steps usually require the changes to be made in a separate associated source program, compiled, and then loaded into the microprocessing unit 46 in place of the previously stored compiled steps. Such a reloading operation creates a time in which microprocessing unit 46 is unavailable for processing incoming messages or generating outgoing messages due to the requirement for the reloading of an active compiled program.

In the known implementation of SCP node 34, the format of network messages to be sent to signaling network 32 are defined by the compiled steps, but the data which may be included within such a formatted message is retrieved from the database in storage device 52. This provides customers with the ability to change the destination of a call, depending upon time of day or day of week or other conditions. However, it is not possible in the known system as shown in FIGS. 1 and 2 to maintain SCP node 34 in operation and make a change to the format of a network message to be sent to the signaling network 32. Thus, a service disruption will be required if a customer request requires a change to the format of the network messages exchanged between the SCP node 34 and the switches. This service disruption is caused by the requirement to load a new compiled program having the capability to provide the new formatting corresponding to the new service.

For example, assume that a customer desires that all calls be routed to agents at a Chicago, Ill. destination, but when all lines to the agents are busy, additional calls are to be rerouted to agents at a destination in Atlanta, Georgia. Since the determination of whether a number is busy or not will be determined by the associated terminating (destination) switch, alternative number information would be required to be routed as part of a network message sent by the SCP node 34 to the first destination switch (Chicago). Such a message would require the transmitting of a first destination number and a second alternate destination number which would be utilized in the event of a busy condition at the first destination number. Assuming that a format capable of sending two potential destination numbers along with an indication of the parameter which would cause the selection of the alternate destination number (busy state) is not an established format in compiled steps 56 of microprocessing unit 46, a new compiled program containing this capability would be required to be loaded and would require a service disruption. Thus, there exists a need for an improved method for providing greater flexibility in allowing a network operator to implement service changes by generating control messages with different formats without requiring a service disruption in the telecommunication network.

SUMMARY OF THE INVENTION

It is an object of the present invention to overcome the above-referenced problem. An embodiment of the present invention permits network messages having a format not previously defined to be utilized to provide a desired customer service without requiring a service disruption.

In accordance with an embodiment of the present invention, an improved SCP node stores a computer implemented program that interprets message instructions which define the message format of a network message to be transmitted to and received from an appropriate switch. The message instruction identifies a format and includes a data field structure which defines data to be included in a network message generated by the SCP node in a message origination mode and defines data to be extracted from a received message in a message reception mode.

In a message origination mode, a determination is made by the SCP node if a received instruction from a SMS is valid. Data contained in the program is copied to a corresponding variable of the computer implemented program as defined by mapping instructions contained in the field instructions. A network message is generated by the SCP node based on the format defined by the message instruction and the data contained in the variables of the computer implemented program. The generated network message is then transmitted via the signaling network to the central office switch or toll switch needed to act on the message. This permits network messages with previously undefined formats to be created without an SCP node service disruption.

DETAILED DESCRIPTION

Figure 3:
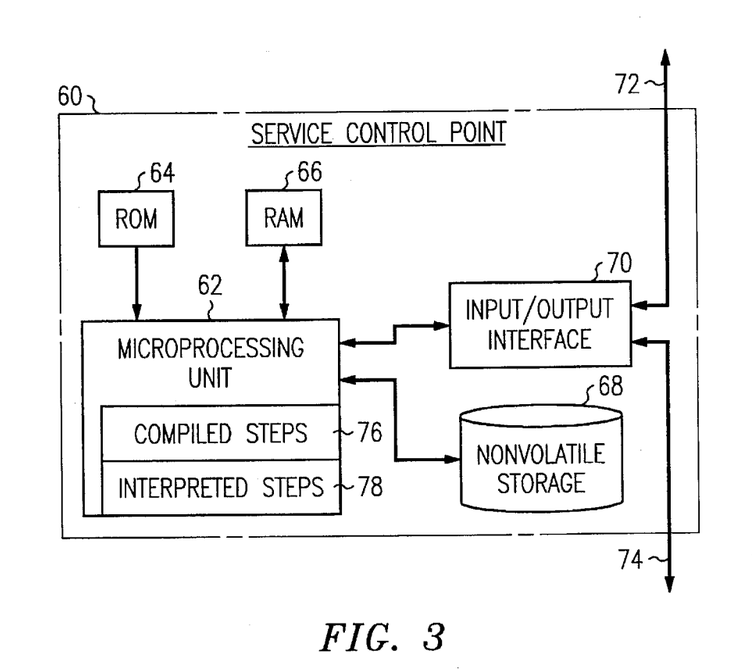
FIG. 3 illustrates an embodiment in accordance with the present invention of a service control point node.

FIG. 3 illustrates an SCP node 60 in accordance with an embodiment of the present invention. The SCP node 60 includes a microprocessing unit 62, ROM 64, RAM 66, and nonvolatile data storage element 68. An input/output interface circuit 70 is coupled to the MPU and facilitates communication of instruction messages sent to the SCP node on communication channel 72, and the reception and transmission of network messages on channel 74 to the signaling network. Since SCP node 60 contains elements which function in substantially the same way as the corresponding elements in SCP node 34, only the differences relating to SCP node 60 will be discussed.

The microprocessing unit 62 includes control program instructions both in the form of compiled steps 76 and interpreted steps 78. As will be appreciated by those skilled in the art, the program instructions which consist of compiled steps 76 can be directly executed by microprocessing unit 62 while the use of steps 78 which must be interpreted, can not be directly executed by the microprocessing unit 62 but must be translated into steps which can be directly executed. Those skilled in the art will recognize a variety of interpretive languages exist. For example, many versions of the BASIC language have been developed as an interpretative language in which computer instructions as written by a user must be interpreted or translated into an executable format prior to execution by the host microprocessor. It is also known that for versions of BASIC, compilers exist which will generate a compiled and executable program based on program instructions written in the native BASIC language. Thus, it is generally known in the art that languages and applications exist which operate as a directly executable program, i.e. a compiled sequence of steps, and which also are an interpreted application which must be translated usually by the interpreted program itself into steps which can be directly executed by the microprocessor. The choice of the specific languages selected will vary depending upon the design criteria, the microprocessor used, and familiarity of the designer with the particular programs and languages.

An important aspect of the present invention resides in at least a portion of the program which provides operational control of microprocessing unit 62 consisting of interpreted steps. Additional modules or routines that provide operational control of the microprocessor will preferably exist as compiled steps 76. The interpreted program portion provides the advantage that different formats of network messages can be implemented by issuing interpreted program instructions without taking the microprocessing unit 62 out of service. In accordance with an important aspect of the present invention, message instructions transmitted to the SCP node 60 by a service management system are provided as steps to be interpreted, thereby permitting different network message formats to be constructed as needed and implemented by the microprocessing unit 62 without requiring a service disruption.

Figure 4:
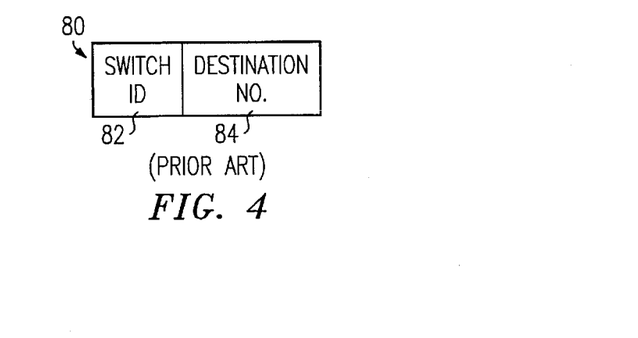
FIG. 4 illustrates a defined format network message as known in the prior art.

FIG. 4 illustrates a network message 80 such as predefined in prior art implementations. The network message 80 represents a "TCAP END MESSAGE" transmitted by the SCP node in response to a "TCAP BEGIN MESSAGE" in which a request for instructions is requested, such as associated with an 800 number dialed by a caller. The TCAP END MESSAGE contains the switch identification 82 which identifies the switch to receive the message and contains the routing or destination number 84 which identifies the subscriber number to which the call request is to be routed. The selection of the destination number is based on reference to previously defined subscriber call routing data stored in a customer data table in storage device 68 of the SCP node 60. Reference to the customer data table yields a predefined destination number to which the call request is to be routed.

In accordance with prior art implementation such as shown in the SCP node 34 in FIG. 2, the network message 80 would be generated in accordance with compiled steps 56 and would carry a destination number 84 stored in the database in storage device 52. The TCAP END MESSAGE would be formatted and the destination number inserted into the corresponding format fields in accordance with compiled steps 56 and transmitted by input/output interface 54 and channel 36 to signaling network 32 to be delivered to the appropriate switch to execute the handling instructions. Customer control is permitted within such a system as long as different customer information stored in the database can merely be inserted into a different existing field in a message having a predetermined format. Should a subscriber desire a handling technique which requires additional information beyond information which can be inserted into a field of a predefined message format, such requests were not easily handled in accordance with prior art implementations and required new compiled steps 56 to be generated to accommodate the information to be inserted into a new format. This, of course, required the SCP node 34 to be taken out of service for the modified compiled steps to be loaded in place of the original compiled steps 56.

Figure 5:
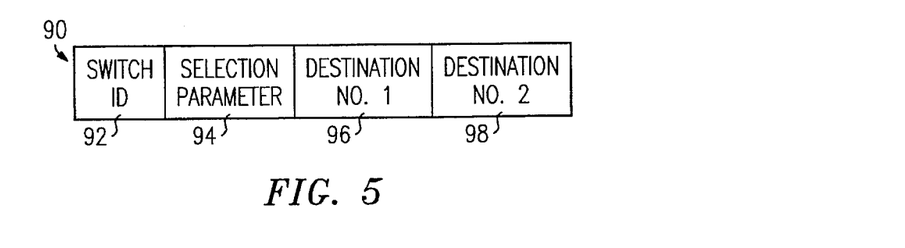
FIG. 5 illustrates a network message containing a plurality of fields not previously defined in a stored format in the SCP node in accordance with the present invention.

FIG. 5 illustrates a network message 90 in accordance with an embodiment of the present invention which is generated by SCP node 60. Network message 90 constitutes a new format (new category of information or new arrangement of information) not previously defined in accordance with compiled steps 76 or interpreted steps 78. In the illustrative example, the information may be utilized to satisfy a new customer need. For incoming calls to a predetermined 800 number, the customer desires the call to be initially routed to a first group of agents at destination "telephone" number 1, but if all agent lines are busy at this location, it is desired that the call then be transferred to agents located at destination number 2. The network message 90 contains a format with fields containing the switch identification 92 of the switch to receive the handling instructions, and, a selection parameter 94 which defines a condition, event, or other parameter upon which a selection criteria is to be made. Fields 96 and 98 correspond to the destination numbers 1 and 2, respectively, which are associated with the selection parameter. In the illustrative example, the selection parameter 94 will specify a busy status associated with field 96. This message will be interpreted by the switch identified in switch ID field 92 to first route the call to the number associated with field 96 but to determine whether the busy parameter is true or false. If there is no busy condition, the switch tenders or connects the associated call to the number identified in field 96. However, if the line(s) associated with the number in field 96 are all busy as defined by the selection parameter 94, then the switch responsible for routing the call request will unconditionally route the call to the number associated with field 98. In this manner, the subscriber's desired handling of the call is effectuated by an alternative decision to forward the call to a secondary number if the first number is busy.

Figure 6:
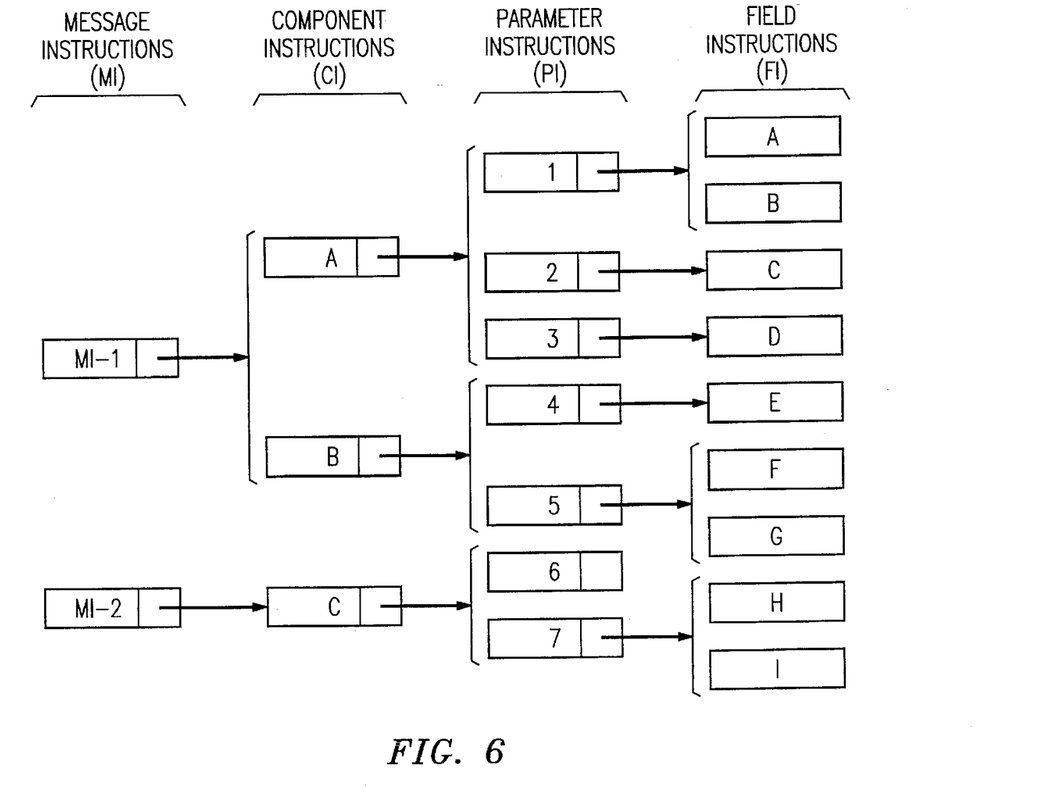
FIG. 6 illustrates an exploded representation of message instructions and parts thereof in accordance with an embodiment of the present invention.

FIG. 6 is a pictorial illustration indicating the different elements contained by message instructions (MI) which are specified by a service creation administrator and transmitted by the service management system to SCP node 60. FIG. 6 as viewed from left to right illustrates that message instruction MI-1 includes component instructions (CI) consisting of CI-A and CI-B. Component instructions CI-A includes parameter instructions (PI) consisting of PI-1, PI-2, and PI-3. Field instructions (FI) consisting of FI-A and FI-B are contained by parameter instruction PI-1; FI-C is contained by PI-2; and FI-D is contained by PI-3. Similarly, component instruction CI-B contains parameter instruction PI-Y and PI-5, which in turn contain field instructions FI-E, and FI-F, FI-G, respectively. Message instruction MI-2 includes component instruction CI-C which in trun includes parameter instructions PI-6 and PI-7. Field instrucitions FI-H and are centained parameter instruction PI-7. The purpose of the elements as shown in FIG. 6 is to provide control information and user data to interpreted steps 78 of SCP node 60 to enable the generation of a network message by microprocessing unit 62 based on the interpreted message instructions.

Each MI contains basic information related to the network message to be formed such as the state(s) of message handling which constitutes a valid state(s) for the implementation of the instructions. The MI also contains a definition as to which component instructions are valid to be included in the message. The component instructions contain information which identifies the function or nature of the action to be taken as well as definition of parameter instructions which are valid to be associated with the particular component instruction. The parameter instructions contain information including the length of the parameter and a definition of the field instructions which are valid for inclusion with the parameter instruction. The field instructions contain the information needed to map or associate data stored in data fields of the SCP program with variables of compiled service logic steps 76 to be executed by the microprocessing unit 62.

The illustrated hierarchy of instructions shown in FIG. 6 provides a specification in which succeeding instructions are defined as valid by the preceding instructions. For example, component instruction A can contain parameter instructions 1, 2, and/or 3. This format definition provides a mechanism for validating the proper generation of a message instruction and hence, provides a mechanism for maintaining the quality of instructions generated by the service creation administrator. For example, if a message was generated with a parameter instruction 4 associated with a component instruction A, such a message would not be in accordance with the defined specification and would be rejected as invalid by microprocessing unit 62 based upon the validity definition contained in component instruction A which defined only parameter instructions 1, 2, and/or 3 as being valid. The microprocessing 62 contains, in the interpreted steps 78, a predetermined and stored program sequence by which received message instructions and the hierarchy of included instructions are expanded to enable a validity check to be made of each hierarchical level.

If the message is valid, the field instructions are interpreted by interpreted steps 78 of microprocessing unit 62 and previously stored data identified by the field instructions is copied to predefined variables which are accessible by the service logic. Information is contained in the message instructions which define which service logic program or routine is to be enabled following the transfer of data. The function of the service logic is to utilize information conveyed by the message instructions via interpreted steps 78 to generate network messages. The service processing logic is also responsible for receiving and decoding received network messages which seek handling instructions for information defining an associated call request.

Figure 7:
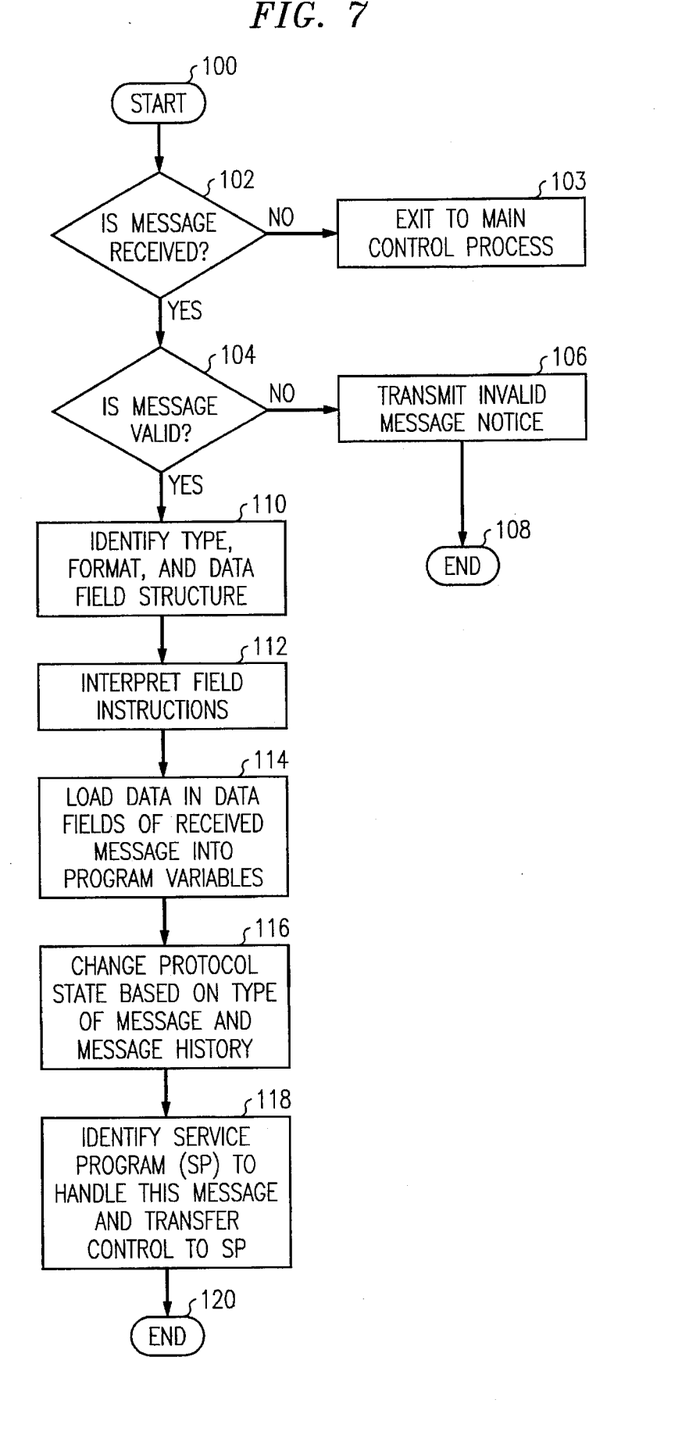
FIG. 7 illustrates a flow diagram of computer implemented program steps showing the processing of a network message received by an SCP node.

FIG. 7 illustrates a flow diagram of an exemplary method in accordance with the present invention for receiving and processing network messages transmitted by the signaling network to an SCP node. It will be apparent to those skilled in the art that the illustrative steps comprise a part of an overall series of steps and routines utilized by the SCP node to carry out other functions. Beginning at START 100, a determination is made in step 102 of whether a network message has been received by the SCP node. A NO determination results in the return of control to a main control process as indicated at step 103. The main control process periodically transfers control to the illustrated steps beginning at START 100 in order to process any received network messages.

Upon a YES determination by step 102, a further determination is made in step 104 of whether the network message is valid. A received network message may contain information such as explained above with regard to FIG. 5, however, the format of such information is defined in accordance with the message instruction hierarchy explained with regard to FIG. 6. Thus, received network messages can be validated by first identifying the type of received message, and then comparing the received information against the expected information based on the hierarchical definitions contained in stored message instructions for the same type of message. A NO determination in step 104 leads to the transmission of a notice of an invalid message as indicated at 106 to the originating source of the network message. An invalid received network message is not further processed as indicated by END 108.

A YES determination by step 104 results in the identification of type, format, and data field structures in step 110 associated with the network message. As explained with regard to FIG. 6, this information is contained in the hierarchical definitions and data contained in the message instructions. Next, the field instructions are interpreted by decoding the information contained in the field instructions needed to map the data contained in the received message into corresponding variables which will be processed by the service logic program. Thus, as indicated in step 112, the field instructions are interpreted. Having defined the appropriate variables which will store the data contained in the received message, this data is then loaded into the corresponding program variables as indicated in step 114.

The protocol state associated with the processing of the corresponding network message is changed based on the type of message and message history as indicated in step 116. For example, a series of network messages may be required in order to effectuate a handling of a call request wherein the history of the series of messages will be maintained in a table in the SCP database and the corresponding position in the series of a particular received network message will be maintained and updated. The protocol states of network messages enables the SCP node to determine appropriate programs required to process the particular message depending upon its type and history relating to this message and related prior messages. Following an updating of the protocol state associated with the currently processed network message, a service program is identified to handle this message in accordance with step 118. Control is then transferred to the identified service program which is identified based on the received message type, protocol state of the message, and other relevant predetermined factors based on the formatting and data contained in the received network message.

It will be apparent to those skilled in the art that a variety of message types and formats is permitted in accordance with the embodiment of the present invention and hence, a variety of service programs may be required to carry out actions and take additional steps in order to effectively implement the desired handling of a call request. For example, types of service programs include steps for data retrieval from the database stored at the SCP in order to obtain stored customer information concerning the desired handling of a call request identified by a received network message. The steps as illustrated in FIG. 7 concludes at END 120.

Figure 8:
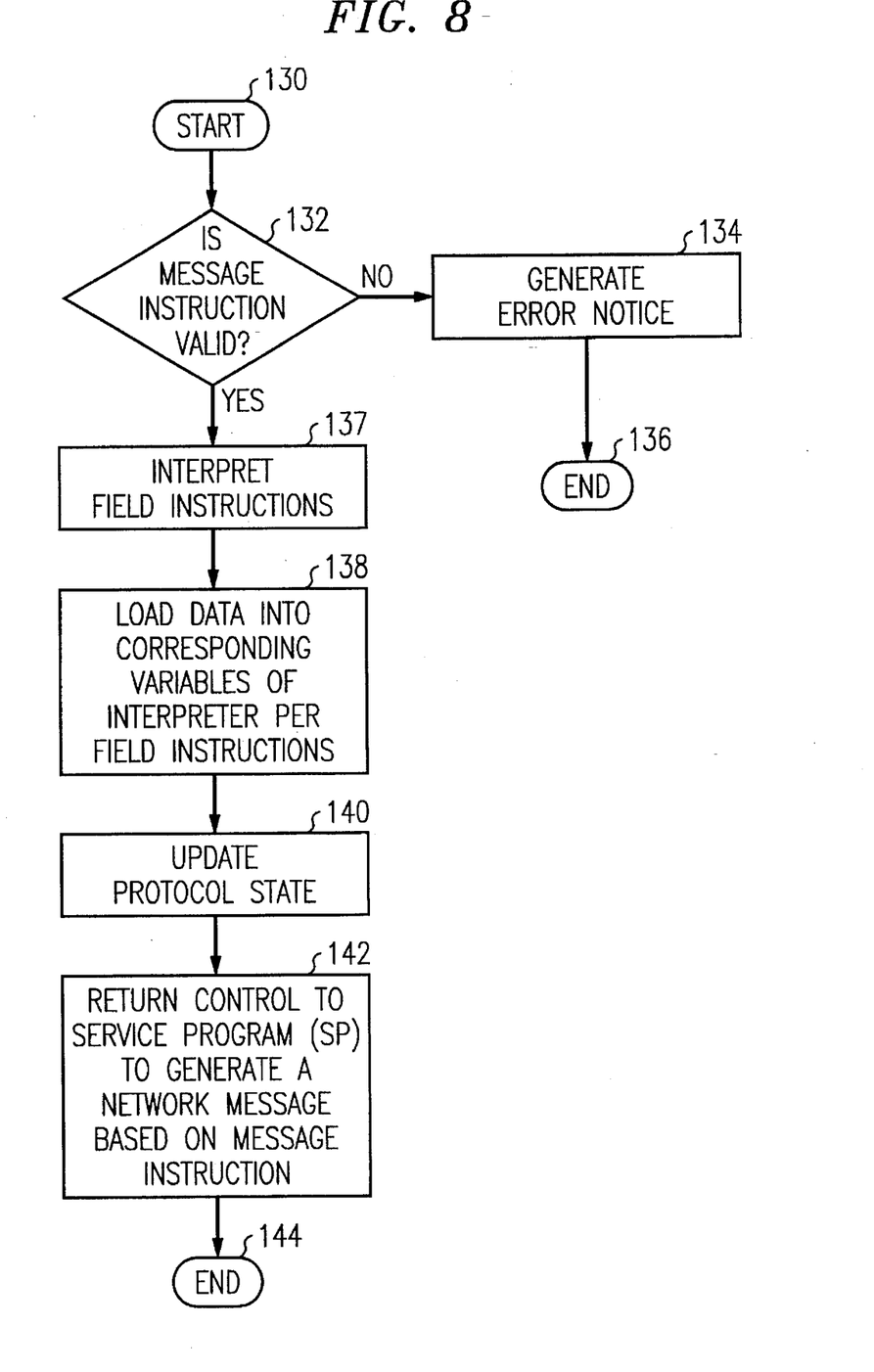
FIG. 8 is a flow diagram of computer implemented steps associated with the generation of a network message based on the receipt of a message instruction by the SCP node.

FIG. 8 illustrates a flow diagram of an exemplary embodiment of steps in accordance with the present invention depicting steps associated with the generation of a network message by the SCP node based on message instructions received by the SCP node such as from the service management system. The steps shown in FIG. 8 are initiated by a compiled service program in the SCP transferring control to START 130. A determination is made in step 132 of whether a received message instruction is valid. As previously explained, the validity of a message instruction can be determined based on the hierarchical definitional structure of the message instructions. A NO determination by step 132 results in the generation of an error notice by generate error notice step 134 indicating that the message instruction was invalid and results in the termination of processing as indicated by END 136. A YES determination by step 132 results in the field instructions being interpreted in step 137 to provide a map of which variables of the service program are to receive data stored in the service program. In step 138 the identified data is loaded into corresponding variables of a service program identified by information carried in the field instructions. Thus, the interpreting of field instructions causes the corresponding data to be loaded into the identified variables; the data contained in these variables is later loaded by the appropriate service program into data fields in a network message to be transmitted. In step 140 the protocol state associated with the message instruction is updated in a table stored in the SCP node database that maintains a history of information related to the message instruction or series of message instructions related to a common call processing requirement. In step 142 control is returned to the service program to build the network message based on the message instructions and data loaded into corresponding variables. The selected service program indirectly accesses the data by using the values of the corresponding variables in order to generate and transmit a network message. It will be apparent to those skilled in the art that the service programs can provide a plurality of functions. The steps of the illustrated embodiment conclude at END 144.

Although an embodiment of the present invention has been described above and shown in the drawings, other applications of invention are possible. For example, switches which receive the network messages are also suitable apparatus for employing an embodiment of the invention. This would provide such switches with the advantages as described for the SCP node in the illustrative embodiment. That is, such switches would be able to receive and generate network messages of previously undefined formats without requiring a reload of the compiled operating system program. This would facilitate ease of changes to call handling that requires different message formats. The scope of the invention is defined by the claims which follow.

The invention claimed is:

1. In a telecommunication network having a plurality of central office switches that directly serve subscribers, interoffice switches that provide communication channels on demand among the central office switches, a signaling network that controls handling requests for service via the interoffice switches, and a network service control point (SCP) node coupled to the signaling network, the SCP node storing call handling information and transmitting a first network message having predetermined stored set of formats defining the handling of said requests for service, a method for generating a second network message having a format not included in said predetermined set of formats, the method of comprising the steps of:

(a) storing in the SCP node a computer implemented program that interprets instructions received from a service management system coupled to the SCP node;

(b) receiving at the SCP node a first instruction identifying a format and data field structure of the second network message;

(c) determining at the SCP node if the first instruction is a valid instruction;

(d) if the first instruction is determined to be valid, copying at the SCP node data associated with data instructions contained in the data field structure to corresponding variables of the computer implemented program;

(e) generating the second network message at the SCP node based on the format defined by the first instruction and data contained in the variables of the computer implemented program; and (f) transmitting the second network message from the SCP node via the signaling network to one of the central office switches and interoffice switches.

2. The method according to claim 1 wherein the step of generating the second network message includes the steps of identifying one service program at the SCP node from among a plurality of stored service programs to process the interpreted first instruction and transferring control to the identified service program.

3. The method according to claim 1 wherein the first instruction includes at least one component instruction, at least one parameter instruction, and at least one field instruction, the at least one component instruction identifying valid parameter instructions which can be included in the first instruction, the at least one parameter instruction identifying valid field instructions which can be included in the first instruction, identify the at least one field instruction including said data instructions that identify the variables to receive the stored data.

4. The method according to claim 1 further comprising the steps of storing the status of network messages transmitted by the SCP node, and using said status as a parameter in the determination of whether the first instruction is valid.

5. The method according to claim 4 further comprising the step of updating said status upon the transmission of the second network message.

6. In a telecommunication network having a plurality of central office switches that directly serve subscribers, interoffice switches that provide communication channels on demand among the central office switches, a signaling network that controls handling requests for service via the interoffice switches, and a service control point (SCP) node coupled to the signaling network, the SCP node storing call handling information and receiving network messages from the signaling network requesting instructions for processing an associated call request, a method for handling received network messages comprising the steps of:

(a) receiving at the SCP node a first network message including a format and data field structure;

(b) determining at the SCP node if the first network message is a valid network message;

(c) identifying at the SCP node the format structure of the first network message;

(d) storing in the SCP node a computer implemented program that interprets information contained in the first network message;

(e) transferring data contained in data fields of the network message to selected variables of the computer implemented program as determined by field instructions contained in the data field structure;

(f) identifying at the SCP node one service program from a plurality of stored service programs to process the first network message based on the selected variables containing data transferred from the first network message; and (g) transferring control to said service program which responds to the call request associated with the first network message based on the data contained in said selected variables.

7. The method according to claim 6 further comprising the steps of storing the status of network messages received by the SCP node, and using said status as a parameter in the determination of whether the first network message is valid.

8. The method according to claim 7 further comprising the step of updating said status prior to the transferring of control.

9. In a telecommunications network having a plurality of nodes that control the handling of requests for service, the nodes storing call handling information and transmitting a first network message having one of a predetermined stored set of formats defining the handling of said request for service, a method for generating a second network message having a format not included in said predetermined set of formats, the method comprising the steps of:

(a) storing in a first node a computer implemented program that interprets received instructions;

(b) receiving at the first node a first instruction identifying a format and data field structure of the second network message;

(c) determining at the first node if the first instruction is a valid instruction;

(d) if the first instruction is determined to be valid, copying at the SCP node data associated with data instructions contained in the data field structure to corresponding variables of the computer implemented program;

(e) generating the second network message at the first node based on the format defined by the first instruction and data contained in the variables of the computer implemented program;

(f) transmitting the second network message from the first node to a second node.

10. The method according to claim 9 wherein the step of generating the second network message includes the steps of identifying one service program at the first node from among a plurality of stored service programs to process the interpreted first instruction and transferring control to the identified service program.

11. The method according to claim 9 wherein the first instruction includes at least one component instruction, at least one parameter instruction, and at least one field instruction, the at least one component instruction identifying valid parameter instructions which can be included in the first instruction, the at least one parameter instruction identifying valid field instructions which can be included in the first instruction, and the at least one field instruction including said data instructions that identify the variables to receive the stored data.

12. The method according to claim 9 further comprising the steps of storing the status of network messages transmitted by the first node, and using said status as a parameter in the determination of whether the first instruction is valid.

13. The method according to claim 12 further comprising the step of updating said status upon the transmission of the second network message.

14. In a communication network having a plurality of nodes that control the handling of requests for service, the nodes along a communication handling information and transmitting a first network message having one of a predetermined stored set of formats defining the handling of said requests for service, a method for generating a second network message having a format not included in said predetermined set of formats, the method comprising the steps of;

(a) storing in a first node a computer implemented program that interprets received instructions;

(b) receiving at the first node a first instruction identifying a format and data field structure of the second network message;

(c) transferring data contained in the data field structure to corresponding variables of the computer implemented program;

(d) generating the second network message at the first node based on the format defined by the first instruction and data contained in the variables of the computer implemented program; and (e) transmitting the second network message from the first node to a second node.

15. The method according to claim 14 wherein the step of generating the second network message includes the steps of identifying one service program at the first node from among a plurality of stored service programs to process the interpreted first instruction and transferring control to the identified service program.

16. The method according to claim 14 wherein the first instruction includes at least one component instruction, at least one parameter instruction, and at least one field instruction, the at least one component instruction identifying valid parameter instructions which can be included in the first instruction, the at least one parameter instruction identifying valid field instructions which can be included in the first instruction, and the at least one field instruction including said data instructions that identify the variables to receive the stored data.

17. The method according to claim 14 further comprising the steps of storing the status of network messages transmitted by the first node, and using said status as a parameter in a determination of whether the first instruction is valid.

18. The method according to claim 15 further comprising the step of updating said status upon the transmission of the second network message.

* * * * *